US012610415B2

(12) United States Patent
Mishra et al.

(10) Patent No.: US 12,610,415 B2
(45) Date of Patent: Apr. 21, 2026

(54) MANAGEMENT OF MULTICAST TRAFFIC USING MULTI-LINK OPERATION (MLO) IN WI-FI 7

(71) Applicant: Fortinet, Inc., Sunnyvale, CA (US)

(72) Inventors: Ruchir Mishra, Sunnyvale, CA (US); Ankur Jain, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 342 days.

(21) Appl. No.: 18/542,060

(22) Filed: Dec. 15, 2023

(65) Prior Publication Data

US 2025/0203683 A1     Jun. 19, 2025

(51) Int. Cl.
| | |
|---|---|
| *H04W 76/15* | (2018.01) |
| *H04B 17/318* | (2015.01) |
| *H04W 24/08* | (2009.01) |
| *H04W 84/12* | (2009.01) |

(52) U.S. Cl.
CPC .......... *H04W 76/15* (2018.02); *H04B 17/328* (2023.05); *H04W 24/08* (2013.01); *H04W 84/12* (2013.01)

(58) Field of Classification Search
CPC .................................................... H04W 76/15
See application file for complete search history.

(56) References Cited

U.S. PATENT DOCUMENTS

| | | | |
|---|---|---|---|
| 11,570,653 B2 * | 1/2023 | Thubert ............. | H04W 28/0975 |
| 2022/0022033 A1 * | 1/2022 | Ho .................... | H04W 12/0431 |

| | | | |
|---|---|---|---|
| 2022/0116192 A1 * | 4/2022 | Noh ...................... | H04L 5/0091 |
| 2022/0303907 A1 * | 9/2022 | Shafin ................... | H04W 76/28 |
| 2022/0345276 A1 * | 10/2022 | Redlich ................. | H04L 5/0053 |
| 2023/0103061 A1 * | 3/2023 | Shafin ............... | H04W 52/0216 |
| | | | 370/311 |
| 2023/0239699 A1 * | 7/2023 | Fang ..................... | H04W 16/02 |
| | | | 370/254 |

(Continued)

OTHER PUBLICATIONS

Lopez-Raventos et al, "IEEE 802.11be Multi-Link Operation: When the Best Could Be to Use Only a Single Interface", May 21, 2021 , arXiv:2105.10199v1 (Year: 2021).*

(Continued)

*Primary Examiner* — Guang W Li
(74) *Attorney, Agent, or Firm* — Law Office of Dorian Cartwright; Dorian Cartwright

(57) ABSTRACT

A Wi-Fi controller receives AP scan reports and station scan reports from a plurality of Wi-Fi 7 access points servicing a plurality of stations for wireless access to the data communication network. Each Wi-Fi 7 access point has multiple links being monitored across 2.4 GHz, 5 GHz and 6 GHz. A global link utilization table of station versus channel utilization is generated from the access point reports and station scan reports. A threshold of channel utilization on the first link of the first Wi-Fi 7 access point being exceeded is detected, while also detecting multicast traffic on the first link and detecting that the first Wi-Fi 7 station is Wi-Fi 7 capable. Responsive to the detections, multicast traffic is steered from the to the first link (e.g., higher frequency band and/or higher channel bandwidth) to the second link (e.g., lower frequency band and/or lower channel bandwidth), including steering multicast traffic from a second application on the first Wi-Fi 7 station to the second link.

20 Claims, 6 Drawing Sheets

(56)             References Cited

U.S. PATENT DOCUMENTS

| | | | |
|---|---|---|---|
| 2023/0284107 A1* | 9/2023 | Gan | H04L 41/082 |
| | | | 370/331 |
| 2023/0388920 A1* | 11/2023 | Solaija | H04W 40/12 |
| 2024/0007395 A1* | 1/2024 | Gundavelli | H04W 40/12 |
| 2024/0023179 A1* | 1/2024 | Monajemi | H04W 76/15 |
| 2024/0098811 A1* | 3/2024 | Huang | H04W 48/16 |
| 2024/0306196 A1* | 9/2024 | Vaidya | H04W 74/0808 |
| 2024/0373362 A1* | 11/2024 | Banerjea | H04W 52/0248 |
| 2025/0048174 A1* | 2/2025 | Sun | H04W 28/0278 |
| 2025/0113264 A1* | 4/2025 | Patil | H04W 36/0069 |
| 2025/0167923 A1* | 5/2025 | Di Taranto | H04B 7/024 |
| 2025/0193923 A1* | 6/2025 | Qi | H04W 84/12 |
| 2025/0203683 A1* | 6/2025 | Mishra | H04B 17/328 |
| 2025/0343665 A1* | 11/2025 | Sedin | H04L 5/0098 |

OTHER PUBLICATIONS

Zhang et al. "IEEE 802.11be Network Throughput Optimization with Multi-Link Operation and AP coordination". Dec. 1, 2023, zrXuv:2312.00345v1 (Year: 2023).*

* cited by examiner

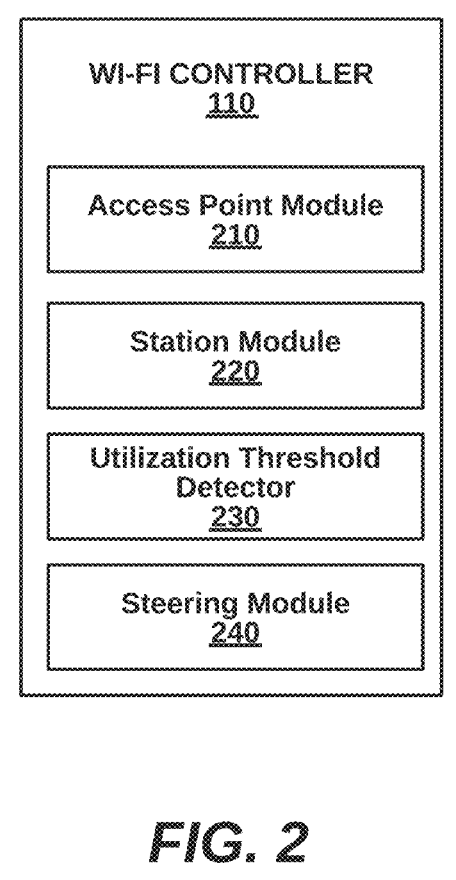

WI-FI CONTROLLER
110

Access Point Module
210

Station Module
220

Utilization Threshold
Detector
230

Steering Module
240

*FIG. 2*

```
Category code: WNM (10)
Action code: BSS Transition Management Request (7)
Dialog token: 0x02
.... ...1 = Preferred Candidate List Included: 1
.... ..0. = Abridged: 0
.... .1.. = Disassociation Imminent: 1
.... 0... = BSS Termination Included: 0
...0 .... = ESS Disassociation Imminent: 0
Disassociation Timer: 40
Validity Interval: 100
BSS Transition Candidate List Entries: 340de6ff02360b20000000ef0940000301ff
Tag: Neighbor Report
    Tag Number: Neighbor Report (52)
    Tag length: 13
    BSSID: e6:ff:02:36:0b:20 (e6:ff:02:36:0b:20)
    BSSID Information: 0xef000000
        .... .... .... .... .... .... .... ..00 = AP Reachability: Reserved (0x0)
        .... .... .... .... .... .... .... .0.. = Security: False
        .... .... .... .... .... .... .... 0... = Key Scope: False
        .... .... .... .... .... ..00 0000 .... = Capability: 0x00
        .... .... .... .... .... .0.. .... .... = Mobility Domain: False
        .... .... .... .... .... 0... .... .... = High Throughput Control (+HTC): False
        .... .... .... .... ...0 .... .... .... = Very High Throughput (+VHT): False
        .... .... .... .... ..0. .... .... .... = Fine Timing Measurement (FTM): False
        .... .... .... .... .0.. .... .... .... = High Efficiency (HE AP): False
        .... .... .... .... 0... .... .... .... = Extended Range BSS: False
        1110 1111 0000 0000 .... .... .... .... = Reserved: 0xef00
    Operating Class: 9
    Channel Number: 64 (iterative measurements on that Channel Number)
    PHY Type: 0x00
```

START

RECEIVE AP SCAN REPORTS AND STATION SCAN REPORTS FROM WI-FI 7 ACCESS POINTS CONNECTED TO WI-FI 7 STATIONS USING MULTIPLE LINKS AT THE SAME TIME
410

STEER MULTICAST TRAFFIC TO A SPECIFIC LINK OF THE MULTIPLE LINKS BASED ON A GLOBAL UTILIZATION TABLE
420 (SEE FIG. 5)

UPDATE THE GLOBAL UTILIZATION TABLE TO REFFLECT STEERING
430

END

<u>600</u>

Memory
<u>610</u>

Network
Applications
<u>612</u>

Operating System
<u>614</u>

699

Processor
<u>620</u>

Storage Drive
<u>630</u>

I/O Port
<u>640</u>

User
Interface
<u>642</u>

Network
Interface
<u>644</u>

*FIG. 6*

MANAGEMENT OF MULTICAST TRAFFIC USING MULTI-LINK OPERATION (MLO) IN WI-FI 7

FIELD OF THE INVENTION

The invention relates generally to computer networks, and more specifically, for managing adverse effects of multicast traffic over multiple links with Multi-Link Operation (MLO).

BACKGROUND

The demand for seamless connectivity for new real-time applications is rising quickly across a variety of network environments, including the home, workplaces, public spaces, and industrial applications. These applications include 4K/8K streaming, anticipated AR/VR, remote collaborations, cloud gaming, etc.

Multi-Link Devices (MLDs) can use the 2.4 GHz, 5 GHz, and 6 GHz bands simultaneously with MLO under a variety of conditions, for data aggregation across multiple bands, which greatly increases overall speeds and significantly lowers connection latency for all connected users. Along with MLO, higher modulation technique (4096 QAM) and higher channel-bandwidth support of 320 MHz is also defined. But we're still away to find remedy of network-disruptions caused by multicast traffic on wireless medium.

The Wi-Fi 7 IEEE-standard has some related offerings. One such unique feature is MLO, which will be supported for 2.4 GHz, 5 GHz and 6 GHz frequency bands. Devices can send and receive data over a variety of frequency bands and channels, simultaneously, with the design implementation of MLO.

The Wi-Fi 7 standard allows for the creation of numerous links between the station and the Wi-Fi access point. By simultaneously connecting to the 2.4 GHz, 5 GHz, and 6 GHz bands, throughput, latency, and dependability are all improved. It is perfect for cutting-edge uses including cloud computing, VR/AR, online gaming, and remote work (many of which will use multicast-traffic).

Some advantages or benefits of MLO in Wi-Fi 7 include: 1. Increased data rates (throughput) by combining numerous links operating on various bands and channels; 2. Load balancing reduces congestion on one link and reduces latency for transmissions; 3. Duplicating packets across many links, improves dependability and ensures uninterrupted network traffic even in the presence of interference or congestion; and 4. Traffic differentiation divides various traffic flows into various links.

The presence of multicast traffic and related applications (like multicast video streaming, multicast game streaming and multicast file sharing) drastically lowers performance in 802.11 WLAN. Hence, the presence of single or multiple multicast-traffic groups (with senders/receivers) will create sluggishness in the RF-environment across all 3 Wi-Fi frequency bands.

What is needed is a robust technique for managing adverse effects of multicast traffic over multiple links with MLO.

SUMMARY

To meet the above-described needs, methods, computer program products, and systems for managing adverse effects of multicast traffic over multiple links with MLO.

In one embodiment, AP scan reports and station scan reports are received from a plurality of Wi-Fi 7 access points servicing a plurality of stations for wireless access to the data communication network. Each Wi-Fi 7 access point has multiple links being monitored across 2.4 GHz, 5 GHz and 6 GHz. A global link utilization table of station versus channel utilization is generated from the access point reports and station scan reports. A first Wi-Fi 7 station is executing a first application connected to a first Wi-Fi 7 access point via a first link and the first Wi-Fi 7 station is also executing a second application connected to the first Wi-Fi 7 access point via the first link. The second application uses multicast traffic. The global link utilization table, of some implementations, is updated to reflect the steering.

In still another embodiment, a threshold of channel utilization on the first link of the first Wi-Fi 7 access point being exceeded is detected, while also detecting multicast traffic on the first link and detecting that the first Wi-Fi 7 station is Wi-Fi 7 capable. Responsive to the detections, multicast traffic is steered from the to the first link to the second link, including steering multicast traffic from the second application on the first Wi-Fi 7 station to the second link.

Advantageously, network performance is improved with less adverse effects from multicast traffic.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a more detailed block diagram illustrating a Wi-Fi controller of the system of FIG. 1, according to one embodiment.

FIG. 3 is a more detailed table illustrating a BTM-REQ action frame, according to one embodiment.

FIG. 6 is a block diagram illustrating an example computing device for the system of FIG. 1, according to one embodiment.

DETAILED DESCRIPTION

Methods, computer program products, and systems for managing adverse effects of multicast traffic over multiple links with. The following disclosure is limited only for the purpose of conciseness, as one of ordinary skill in the art will recognize additional embodiments given the ones described herein.

I. Systems for Multicast Traffic Management with MLO (FIGS. 1-3)

Figure 1:
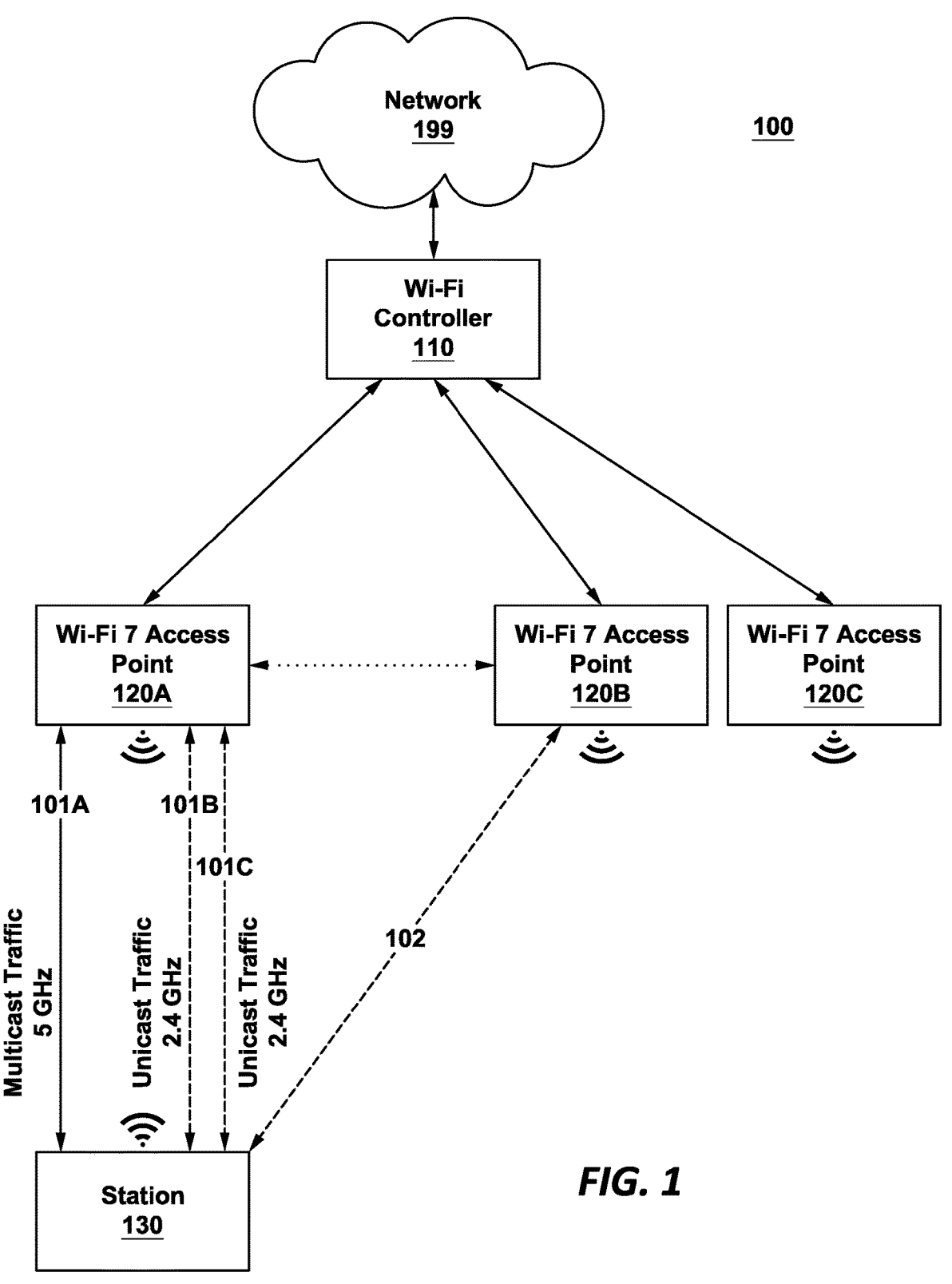
FIG. 1 is a high-level block diagram illustrating aspects of a system coordinating for managing adverse effects of multicast traffic over multiple links with, according to some embodiments.

FIG. 1 is a high-level block diagrams illustrating a system 100 for managing adverse effects of multicast traffic over multiple links with, according to an embodiment. The system 100 includes a Wi-Fi controller 110, Wi-Fi 7 access points 120A, 120B, 120C and a Wi-Fi 7 station 130. Other embodiments of the system 100 can include additional components that are not shown in FIG. 1, such as routers, switches, network gateways, RADIUS servers, and firewalls, as well as additional access points and stations (e.g., Wi-Fi 7 stations, non Wi-Fi 7 stations, future protocol stations, and legacy protocol stations) are also possible. For example, the system 100 of FIG. 1 shows one station and three access points, however, other examples have hundreds of stations connected to access points distributed over different LANs. The components of system 100 can be implemented in hardware, software, or a combination of both. An example implementation is shown in FIG. 6.

In one embodiment, the components of the system 100 are coupled in communication over a private network connected to a public network, such as the Internet. In another embodiment, system 100 is an isolated, private network, or alternatively, a set of geographically dispersed LANs. The components can be connected to the data communication system 199 via hard wire (e.g., Wi-Fi controller 110 and Wi-Fi 7 access points 120A, 120B, 120C). The components can also be connected via wireless networking (e.g., Wi-Fi 7 station 130). The data communication network 199 can be composed of any combination of hybrid networks, such as an SDWAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802,11r, 802.11be, Wi-Fi 6, Wi-Fi 6E, Wi-Fi 7 and the like. Components can use IPv4 or IPv6 address spaces.

One embodiment of the system 100 in operation is described in the following steps, as a non-limiting example:

WiFi-7 access points 120A-C have various means to determine the RF-channel conditions. In particular, channel-utilization can be derived from retries, PPS, operating data-rates, back off-time, TxOP, of all frequency-bands via scan-reports. In a scenario where a Wi-Fi 7 access point determines the presence of multicast traffic on a particular frequency-band, for example on the 5 GHz link. The determination of presence of multicast group (or VLAN group) and group members can be done at the access point level itself, by inspection of its Tx-Rx frames, or can be intimated to access points via a switch which maintains a CAM-table, in some embodiments. In other embodiments, determinations can be made by the Wi-Fi controller 110, or in combination therewith.

Once a Wi-Fi 7 access point determines the presence of multicast traffic, it can start to monitor the channel-utilization of all three radios. In this example, for the 5 GHz frequency band is checked for if the channel utilization crosses a threshold value, such as 50%, for instance. The channel utilization can be compared against the other links of the same access point, 2.4 GHz and 6 GHz, as well as all three links from different access points. As a result, the Wi-Fi 7 access points 120A-C can sends out a report to the Wi-Fi controller 110, with following details: (a) Current channel-utilization of 2.4 GHz, 5 GHz and 6 GHz bands; (b) which of the three bands have hit the threshold value; (c) MAC addresses of stations, on the respective 5 GHz radio which are a part of any multicast-group; (d) radio-band capabilities of these stations. The WiFi-7 access point collects this information through station upstream frames, probes, RNR and 802.11k neighbor reports, among other data sources.

The Wi-Fi controller 110 then determines which of the links on which one of the stations are Wi-Fi 7 capable. If channel utilization of 6 GHz band is below threshold, the Wi-Fi 7 access point is instructed to establish a multi-link with the same station MAC address to load balancing nature of MLO. As a result, the multicast traffic communication (for the respective-station) continues to occur in 5 GHz frequency band, while the other high-priority unicast application data traffic exchange happens on the 6 GHz frequency-band. Based on the isolation of radios between links, in some embodiments, the Wi-Fi 7 access points 120A-C can decide to perform either Simultaneous Transmit and Receive (STR) or Non-Simultaneous Transmit and Receive (N-STR) mode of MLO communications.

The improved technique uses the best available frequency band with minimum channel utilization, for exchange of priority unicast data traffic for the respective station. In alternate embodiments, the multicast traffic is given priority over unicast when selecting a best link. In other embodiments, proactive measures can be taken to clean-up or reduce channel-utilization of, for instance, 5 GHz band, by establishing a new multi-link in 2.4 GHz band. As a result of this example, multicast traffic continues in the 2.4 GHz frequency band, reducing the channel utilization of 5 GHz band and utilizing the 6 GHz band for mission critical user-data traffic (e.g., VOIP traffic, medical devices, etc.). In the absence of any multicast traffic, or no other high priority unicast-application-data traffic, the existing multi-link can be disrupted to meet the needs of other wireless stations catered by the Wi-Fi 7 access points.

In another embodiment of the system 100, the Wi-Fi controller 110 monitors channel utilization of multi-links and load balances over multiple links of one or multiple access points. In more detail, a global utilization report is generated from the station status reports and access point scan reports sent upstream to a centralized part of the network. Each station can be seen by multiple access points, each indicating a different signal strength in relation to each station, in some embodiments, indicated by an RSSI value. The RSSI values can be measured passively or actively.

Thus, in an embodiment, the Wi-Fi controller 110 selects preferred BSSIDs based on the global utilization report. The selection can be initiated by an increase in channel utilization over subsequent reports, or the absolute value of channel utilization on a single report. In turn, the Wi-Fi controller 110 may identify a more ideal connection (e.g., lower channel utilization, lower ratio of multicast traffic, etc.). In some implementations, additional factors are considered RSSI values which are indicative of signal strength between a station and an access point. Ultimately, the Wi-Fi 7 station 130 makes a decision, in view of steering to BSSIDs that are preferred by the Wi-Fi controller 110, in some embodiments. By providing pre-processed information in the form of preferred BSSIDs, the Wi-Fi controller 110 can potentially speed up BSS transitions during roaming. Moreover, network traffic is reduced and active probing is avoided. In other embodiments, forced hand-offs to new links on the same access point or to new links on a different access point implement steering.

The Wi-Fi 7 access points 120A-C each provide local data that is aggregated by the Wi-Fi controller 110. Access point scan reports (or neighbor reports) are generated by listening to other data traffic within RF range of an access point, although not designated for the snooping access point. A parser exposes meta data indicating a BSSID an operating channel of a nearby access point. RSSI values of different data packets associated with the same snooped access point can help in estimating a location or distance away from another access point.

A station status report can also be compiled from snooping data packets, in addition to listing the connected stations. Data packets received from access points and stations are measured for an RSSI value. Stations, along with MAC address, IP address, and the like, are listed in the station status report, transmitted upstream to the Wi-Fi controller 110 by each of the access points 120A-C.

The Wi-Fi access points 120A-C, upon direction of the Wi-Fi controller 110, generate a BTM-Action Req frame to proactively provide BSS roaming data to the station 130, without having to compile a BTM-Query frame (see FIG. 3). One embodiment sets a value for an imminent disassociation field to indicate that the station 130 will be forcibly removed from receiving network service, and therefore, the station 130 is compelled to immediately roam to continue a network connection. Another embodiment further provides a preferred list of BSSID for service. Conventionally, neighbor reports are not provided until requested by the station 130.

A tri-band Wi-Fi 7 capable access point must transmit the multicast traffic at a legacy data rate in order to guarantee that every device connected to the SSID receives it. The initial 802.11abg speeds of 1, 2, 5.5, 6, 9, 11, 12, 18, 24, 36, 48, and 54 Mbps are considered the legacy data rates. This reduces the amount of bandwidth available to other users and raises channel contention. However, this action is required by the 802.11 standard, in one embodiment, in order to support backwards compatibility. These lower-order modulation transmissions take up more space in the medium and interfere with the efficient delivery of traffic to neighboring stations.

The station 130 connects to nearby access points over wireless channels for uploading and downloading data from the data communication network. In many other embodiments, there are many stations, such as four or hundreds of them. From time-to-time, the station 130 roams from one access point to a different access point (e.g., from the access point 120A to the access point 120C), often due to a better RSSI signal being available. The station 130 comprises a Wi-Fi 7 compatible station with multiple link capabilities. Hardware based transceivers and antennae can send and receive signals simultaneously overly multiple links to the same access point or to different access points. For example, the station can communicate over two different radio channels in wireless exchanges with the access point 120A. First, the components can communicate over line 101A for 5 GHz transmissions and simultaneously over line 101B for 6 GHz transmissions. Alternatively, the components can communicate over line 101A for 5 GHz and simultaneously over line 101C for 2.4 GHz transmissions. Furthermore, the components can communicate over line 102, with the Wi-Fi 7 access point 120B.

In operation, one embodiment of the station 130 executes multiple applications, such as two, four or even sixty-four applications, at the same time, through various multitasking technologies. The applications can have different types of traffic, some multicast and some unicast. If multicast traffic has surpassed its threshold, the application using the multicast traffic can be assigned to a link for multicast traffic. The unicast applications can be assigned to a different link for unicast traffic.

In some embodiments, a BTM-REQ action frame is received from the access point 120A. In response, the Wi-Fi 7 station 130 selects a new access point from the at least one preferred access points of the BTM-REQ action frame and an internal RSSI scan table comprising RSSI values with respect to the at least one preferred access points. Then the Wi-Fi 7 station 130 transmits a BTM-RES action frame to notify the access point 120A of its current connection, of upcoming BSS fast transition in connections to a selected one of the at least one preferred access point.

FIG. 2 is a more detailed block diagram illustrating the Wi-Fi controller 110 of the system of FIG. 1, according to one embodiment. The Wi-Fi controller 110 includes an access point module 210, a station module 220, a utilization detector 230 and a steering module 240. The components can be implemented in hardware, software, or a combination of both.

An access point module 210, in an embodiment, receives AP scan reports and station scan reports from a plurality of Wi-Fi 7 access points servicing a plurality of stations for wireless access to the data communication network. Each Wi-Fi 7 access point has multiple links being monitored across 2.4 GHz, 5 GHz and 6 GHz.

The station module 220 can generate a global link utilization table of station versus channel utilization from the access point reports and station scan reports. A first Wi-Fi 7 station is executing a first application connected to a first Wi-Fi 7 access point via a first link and the first Wi-Fi 7 station is also executing a second application connected to the first Wi-Fi 7 access point via the first link. The second application uses multicast traffic. In another embodiment, the station module 220 can update the global link utilization table to reflect steering that has been completed.

The utilization detector 230 is configured to detect a threshold of channel utilization on the first link of the first Wi-Fi 7 access point being exceeded, while also detecting multicast traffic on the first link and detecting that the first Wi-Fi 7 station is Wi-Fi 7 capable.

The steering module, responsive to the detections, can steer multicast traffic from the first link to the second link, including steering multicast traffic from the second application on the first Wi-Fi 7 station to the second link.

II. Methods for Multicast Traffic Management with MLO (FIGS. 4-5)

Figure 4:
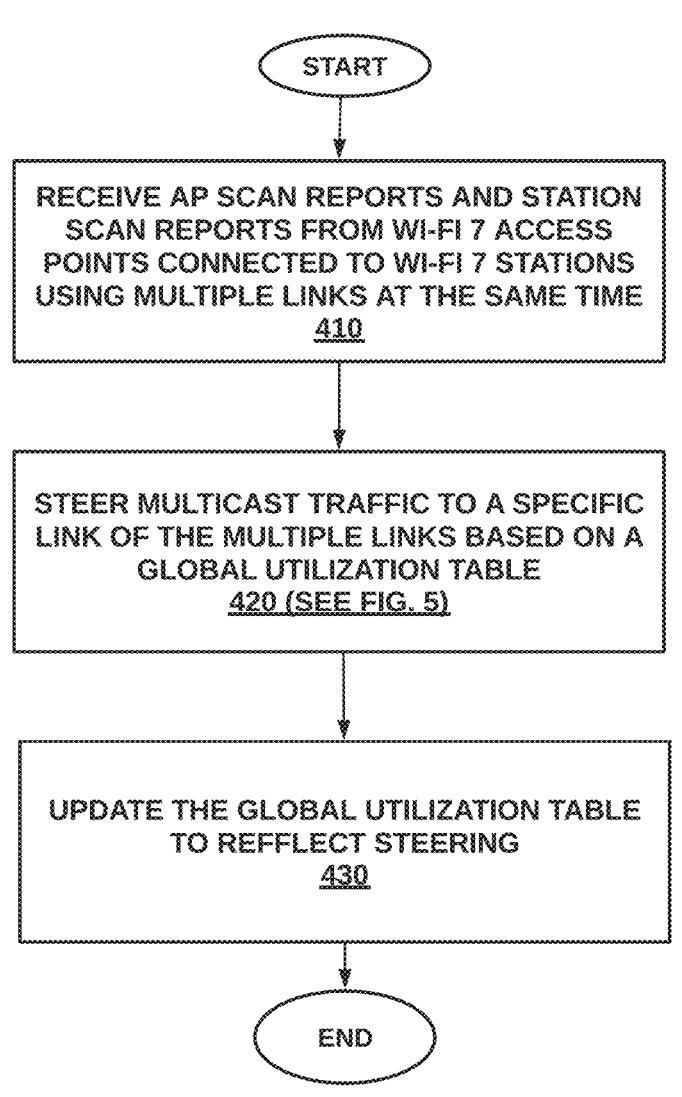
FIG. 4 is a high-level flow diagram illustrating a method for managing adverse effects of multicast traffic over multiple links with, according to an embodiment.
Figure 5:
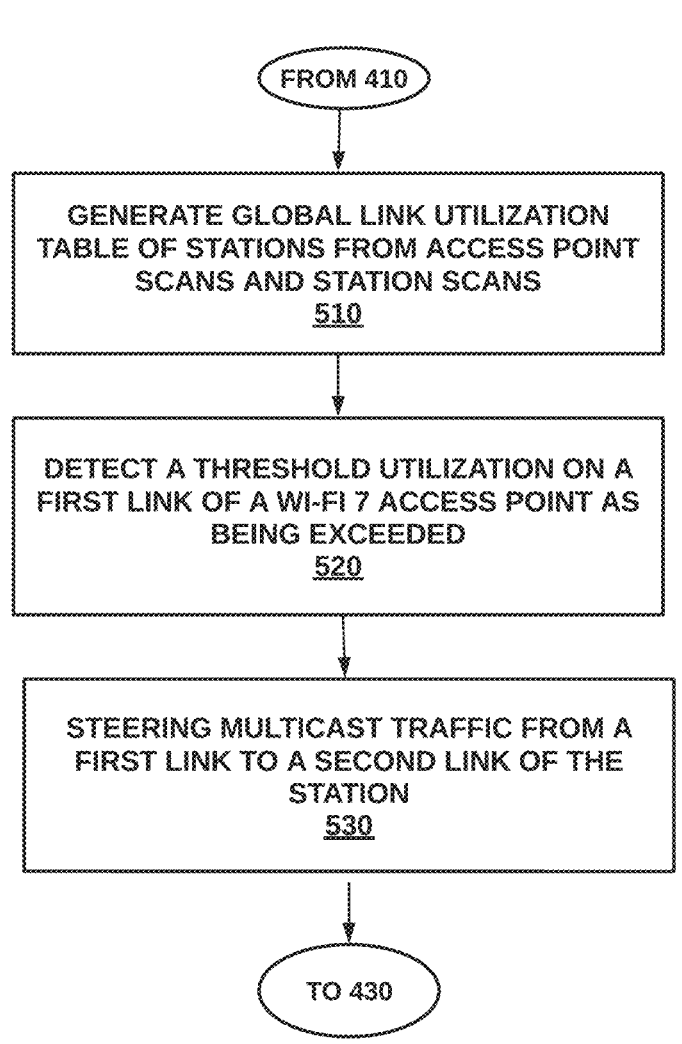
FIG. 5 is a more detailed flow diagram illustrating a step for pre-steering multicast traffic based on a global utilization table, from the method of FIG. 4, according to one embodiment.

FIG. 4 is a high-level flow diagram of a method 400 for managing adverse effects of multicast traffic over multiple links with, according to an embodiment. The method 400 can be implemented by, for example, system 100 of FIG. 1. The specific grouping of functionalities and order of steps are a mere example as many other variations of method 400 are possible, within the spirit of the present disclosure.

Specifically, at step 410, a Wi-Fi controller is communicatively connected over a LAN to manage a plurality of Wi-Fi 7 access points. AP scan reports and station scan reports are received from a plurality of Wi-Fi 7 access points servicing a plurality of stations for wireless access to the data communication network. Each Wi-Fi 7 access point has multiple links being monitored across 2.4 GHz, 5 GHz and 6 GHz.

At step 420, steering multicast traffic to a specific link based on a global link utilization table, as described more fully below in association with FIG. 5.

At step 430, the global link utilization table is updated to reflect the steering, based on traffic from the station.

FIG. 5 is a more detailed flow diagram detailing the step 420 of steering multicast traffic based on a global utilization table. Other variations are possible for different implementations.

At step 510, a global link utilization table of station versus channel utilization is generated from the access point reports and station scan reports. A first Wi-Fi 7 station is executing a first application connected to a first Wi-Fi 7 access point via a first link and the first Wi-Fi 7 station is also executing a second application connected to the first Wi-Fi 7 access point via the first link. The second application uses multicast traffic, in this case.

At step 520, a threshold of channel utilization is detected on the first link of the first Wi-Fi 7 access point as being exceeded, while also detecting multicast traffic on the first link and detecting that the first Wi-Fi 7 station is Wi-Fi 7 capable. In response to the detections, steering multicast traffic is steered from the to the first link to the second link, including steering multicast traffic from the second application on the first Wi-Fi 7 station to the second link, at step 530.

III. Computing Device for Multicast Traffic Management with MLO (FIG. 6)

FIG. 6 is a block diagram illustrating a computing device 600 for use in the system 100 of FIG. 1, according to one embodiment. The computing device 600 is a non-limiting example device for implementing each of the components of the system 100, including the Wi-Fi controller 110, the Wi-Fi 6E access points 120A, 120B, 120C and the station 130. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a Wi-Fi controller on a data communication network, for managing adverse effects of multicast traffic over multiple links with Multi-Link Operation (MLO), the method comprising:

receiving access point scan reports and station scan reports from a plurality of Wi-Fi 7 access points servicing a plurality of stations for wireless access to the data communication network, wherein each Wi-Fi 7 access point has multiple links being monitored across 2.4 GHZ, 5 GHZ and 6 GHZ;

generating a global link utilization table of station versus channel utilization from the access point reports and station scan reports, wherein a first Wi-Fi 7 station is executing a first application connected to a first Wi-Fi 7 access point via a first link and the first Wi-Fi 7 station is also executing a second application connected to the first Wi-Fi 7 access point via the first link, wherein the second application uses multicast traffic;

detecting a threshold of channel utilization on the first link of the first Wi-Fi 7 access point being exceeded, while also detecting multicast traffic on the first link and detecting that the first Wi-Fi 7 station is Wi-Fi 7 capable;

responsive to the detections, steering multicast traffic from the first link to the second link, including steering multicast traffic from the second application on the first Wi-Fi 7 station to the second link; and updating the global link utilization table to reflect the steering.

2. The method of claim 1, wherein a second specific station is connected to the first Wi-Fi 7 access point via the first link, and wherein the second Wi-Fi 7 station uses multicast traffic, and responsive to the detection, steering multicast traffic of the second Wi-Fi 7 station from the first link to a third link of a second Wi-Fi 7 access point of the plurality of Wi-Fi 7 access points.

3. The method of claim 2, wherein the third link has lower channel utilization than the first link.

4. The method of claim 2, wherein the third link has higher channel utilization than the first link.

5. The method of claim 1, wherein the second link has lower channel utilization than the first link.

6. The method of claim 1, wherein the second link has higher channel utilization than the first link.

7. The method of claim 1, wherein the first application of the first Wi-Fi 7 station does not use multicast traffic.

8. The method of claim 1, wherein the step of steering multicast traffic from the first link to the second link comprises notifying the first specific Wi-Fi 7 access point to generate a BSS Transition Management Request (BTM-REQ) action frame having a Preferred Basic Service Set Identifier (BSSID) field set to a BSSID of the second link.

9. The method of claim 1, wherein the step of steering multicast traffic from the first link to the second link comprises notifying the first specific Wi-Fi 7 access point to generate a BSS Transition Management Request (BTM-REQ) action frame having an Imminent Disassociation value set to indicate an upcoming disassociation of the first Wi-Fi 7 access point from the first Wi-Fi 7 station.

10. The method of claim 1, wherein the first Wi-Fi 7 station performs fast BSS transition according to IEEE 802.11r.

11. The method of claim 1, wherein a Radio Signal Strength Indicator associated with the second link is not higher than an RSSI associated with the first link.

12. The method of claim 1, wherein the channel utilization is derived from one or more of retries, operating data rates, back off-time and Transmit Opportunity (TxOP).

13. The method of claim 1, wherein the first Wi-Fi 7 access point detects the multicast traffic on the first link and notifies the Wi-Fi controller.

14. The method of claim 1, wherein the AP scan report and the station scan report sent from the Wi-Fi 7 access points include one or more of current channel utilization of each 2.4 GHz, 5 GHZ and 6 GHZ bands, which of the bands have exceeded the threshold value, MAC addresses of stations, and radio band capabilities of the stations connected to the Wi-Fi 7 access points.

15. A non-transitory computer-readable medium in a Wi-Fi controller on a data communication network, for managing adverse effects of multicast traffic over multiple links with Multi-Link Operation (MLO), the method comprising:

receiving access point scan reports and station scan reports from a plurality of Wi-Fi 7 access points servicing a plurality of stations for wireless access to the data communication network, wherein each Wi-Fi 7 access point has multiple links being monitored across 2.4 GHZ, 5 GHZ and 6 GHZ;

generating a global link utilization table of station versus channel utilization from the access point reports and station scan reports, wherein a first Wi-Fi 7 station is executing a first application connected to a first Wi-Fi 7 access point via a first link and the first Wi-Fi 7 station is also executing a second application connected to the first Wi-Fi 7 access point via the first link, wherein the second application uses multicast traffic;

detecting a threshold of channel utilization on the first link of the first Wi-Fi 7 access point being exceeded, while also detecting multicast traffic on the first link and detecting that the first Wi-Fi 7 station is Wi-Fi 7 capable;

responsive to the detections, steering multicast traffic from the first link to the second link, including steering multicast traffic from the second application on the first Wi-Fi 7 station to the second link; and updating the global link utilization table to reflect the steering.

16. A Wi-Fi controller on a data communication network, for managing adverse effects of multicast traffic over multiple links with Multi-Link Operation (MLO), the Wi-Fi controller comprising:

a processor;

a network interface communicatively coupled to the processor and to a data communication network; and a memory, communicatively coupled to the processor and storing:

an access point module to receive access point scan reports and station scan reports from a plurality of Wi-Fi 7 access points servicing a plurality of stations for wireless access to the data communication network, wherein each Wi-Fi 7 access point has multiple links being monitored across 2.4 GHz, 5 GHZ and 6 GHz;

a station module to generate a global link utilization table of station versus channel utilization from the access point reports and station scan reports, wherein a first Wi-Fi 7 station is executing a first application connected to a first Wi-Fi 7 access point via a first link and the first Wi-Fi 7 station is also executing a second application connected to the first Wi-Fi 7 access point via the first link, wherein the second application uses multicast traffic;

a utilization threshold detector to detect a threshold of channel utilization on the first link of the first Wi-Fi 7 access point being exceeded, while also detecting multicast traffic on the first link and detecting that the first Wi-Fi 7 station is Wi-Fi 7 capable; and a steering module to, responsive to the detections, steer multicast traffic from the first link to the second link, including steering multicast traffic from the second application on the first Wi-Fi 7 station to the second link, and wherein the station module updates the global link utilization table to reflect the steering.

17. The Wi-Fi controller of claim 16, wherein a second specific station is connected to the first Wi-Fi 7 access point via the first link, and wherein the second Wi-Fi 7 station uses multicast traffic, and responsive to the detection, steering multicast traffic of the second Wi-Fi 7 station from the first link to a third link of a second Wi-Fi 7 access point of the plurality of Wi-Fi 7 access points.

18. The Wi-Fi controller of claim 17, wherein the third link has lower channel utilization than the first link.

19. The Wi-Fi controller of claim 17, wherein the third link has higher channel utilization than the first link.

20. The Wi-Fi controller of claim 16, wherein the second link has lower channel utilization than the first link.

* * * * *